(12) United States Patent
Smith

(10) Patent No.: US 8,388,008 B2
(45) Date of Patent: Mar. 5, 2013

(54) LEG SUPPORT FOR A MOTORCYCLE

(76) Inventor: Stephen Smith, Yarraman (AU)

(*) Notice: Subject to any disclaimer, the term of this patent is extended or adjusted under 35 U.S.C. 154(b) by 223 days.

(21) Appl. No.: 12/383,442

(22) Filed: Mar. 24, 2009

(65) Prior Publication Data

US 2009/0184489 A1 Jul. 23, 2009

(51) Int. Cl.
*B62J 25/00* (2006.01)

(52) U.S. Cl. .................. 280/291; 280/304.3; 280/304.4

(58) Field of Classification Search .......... 280/291, 280/304.3, 304.4
See application file for complete search history.

(56) References Cited

U.S. PATENT DOCUMENTS

| | | | |
|---|---|---|---|
| 5,090,715 A | 2/1992 | Nakajima et al. | |
| 5,779,254 A * | 7/1998 | James et al. | 280/291 |
| 6,688,629 B2 * | 2/2004 | Essinger | 280/291 |
| 2002/0158441 A1 * | 10/2002 | Essinger | 280/291 |
| 2006/0181054 A1 | 8/2006 | Colano | |
| 2006/0197307 A1 * | 9/2006 | Dubbe | 280/291 |

FOREIGN PATENT DOCUMENTS

| | | |
|---|---|---|
| DE | 19511761 | 10/1996 |
| EP | 424918 | 5/1991 |
| EP | 1382521 | 1/2004 |
| GB | 2169502 A | 7/1986 |
| JP | 11-310178 A | 11/1999 |
| JP | 2006 315653 | 11/2006 |

OTHER PUBLICATIONS

Supplementary European Search Report for corresponding European Patent Application No. 07815252, mailed Feb. 22, 2012.

* cited by examiner

*Primary Examiner* — Tony H. Winner
*Assistant Examiner* — Jacob Knutson
(74) *Attorney, Agent, or Firm* — Holland & Hart LLP

(57) ABSTRACT

A leg support for a motorcycle and/or bicycle including a support member, a body portion and at least one securing means for securing said body portion and/or support member to the motorcycle, whereby the leg support provides a means of assisting a person to hold their body in a forward position while riding.

10 Claims, 2 Drawing Sheets

LEG SUPPORT FOR A MOTORCYCLE

This application claims priority based upon PCT application Ser. No. PCT/AU2007/001435, filed on Sep. 28, 2007, which claims priority based upon Australian patent application Ser. No. 2006905380 filed on Sep. 29, 2006.

FIELD OF THE INVENTION

The invention relates to motorcycle and bike accessories and in particular, to a leg support for a motorcycle which provides a means of assisting a person to hold their body in a forward position while riding.

Whilst the invention can be modified to be applied to any type of bike or motorcycle, for convenience sake it shall be described herein as a leg support for a motorcycle.

BACKGROUND TO THE INVENTION

Motocross racing is a high adrenaline sport which can be very taxing on a person's body as it requires a great deal of body strength and endurance to hold onto the bike for the duration of a race which can normally last between 10 and 40 mins for sprint and endurance events.

Generally, as a person accelerates they will stand to lean their body in a forward position to gain extra speed relying on their hands to hold onto the bike and maintain the required position. This can be extremely difficult, particularly when riding and accelerating through rough terrain where a person will often grip harder onto the handle in response to the forces exerted by the uneven ground. As a result, a person's arms will often fatigue very quickly as a result of holding onto the handle grips for long durations and/or holding onto the handle, grips too tightly.

Accordingly, it is an object of the present invention to provide a leg support for a motorcycle which provides a means of assisting a person to hold their body in a forward position while riding.

SUMMARY OF THE INVENTION

The present invention provides a leg support for a motorcycle and/or bike including:
a support member;
a body portion; and
at least one securing means for securing said body portion and/or support member to the motorcycle, whereby the leg support provides a means of assisting a person to hold their body in a forward position while riding.

The body portion is preferably in form of a brace member and has at least one outwardly extending portion. A first outwardly extending portion is preferably adapted to extend outwardly from a middle portion of the body portion of the leg support and be attached to a frame of a motorcycle. A second outwardly extending portion is preferably adapted to extend outwardly from a middle portion of the body portion of the leg and be attached to a chassis of a motorcycle.

It is preferred that the first and/or second outwardly extending portions have provided at least one aperture which is adapted to receive a securing means therethrough.

It is further preferred that the second outwardly extending portion has provided a slot which is adapted to receive a securing means therethrough. The slot is preferably adapted to extend along the lateral length of the third outwardly extending member for a prescribed distance to provide a degree of adjustment in a forward or backward direction for a support member attached thereto.

The support member is preferably in the form of a peg or knob which is adapted to be secured to the brace member and chassis of the motorcycle. The peg or knob preferably has provided a central aperture which is adapted to receive a securing means therethrough.

The securing means is preferably in the form of a bolt or screw or the like.

In order that the invention may be more readily understood we will describe by way of non-limiting example, a specific embodiment thereof.

BRIEF DESCRIPTION OF THE DRAWING FIGURES

DETAILED DESCRIPTION OF A PREFERRED EMBODIMENT INVENTION

Figure 1:
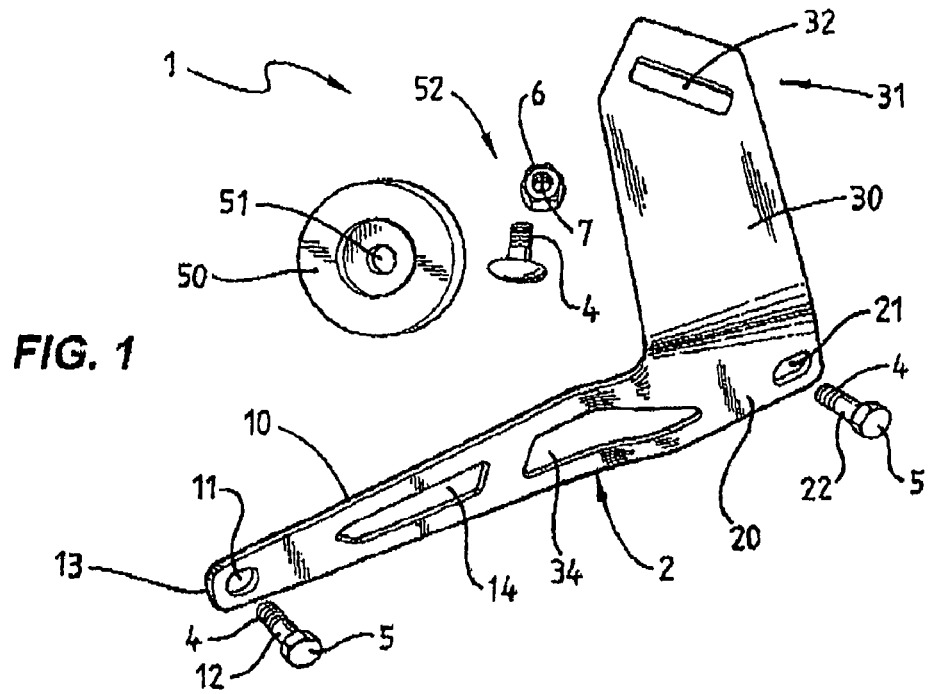
FIG. 1 shows the individual components of the leg support according to an embodiment of the invention.
Figure 2:
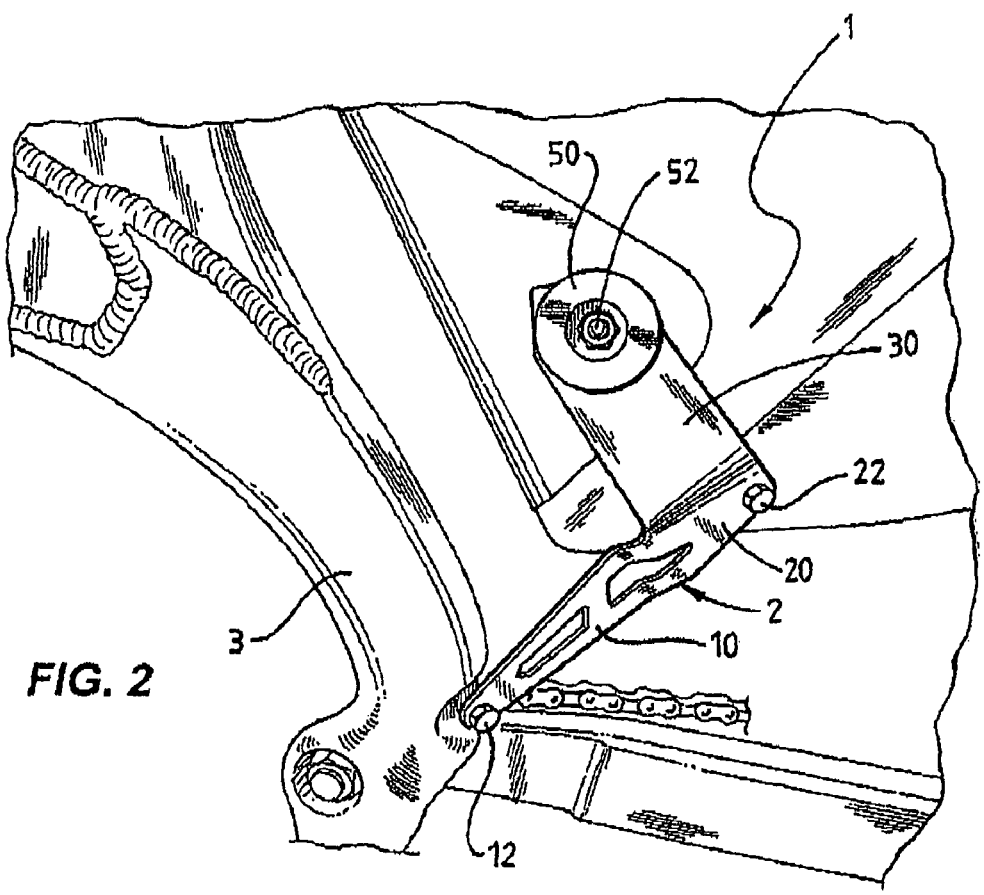
FIG. 2 shows a front view of the leg support attached to the chassis/frame of a motorcycle according to a preferred embodiment of the invention.
Figure 3:
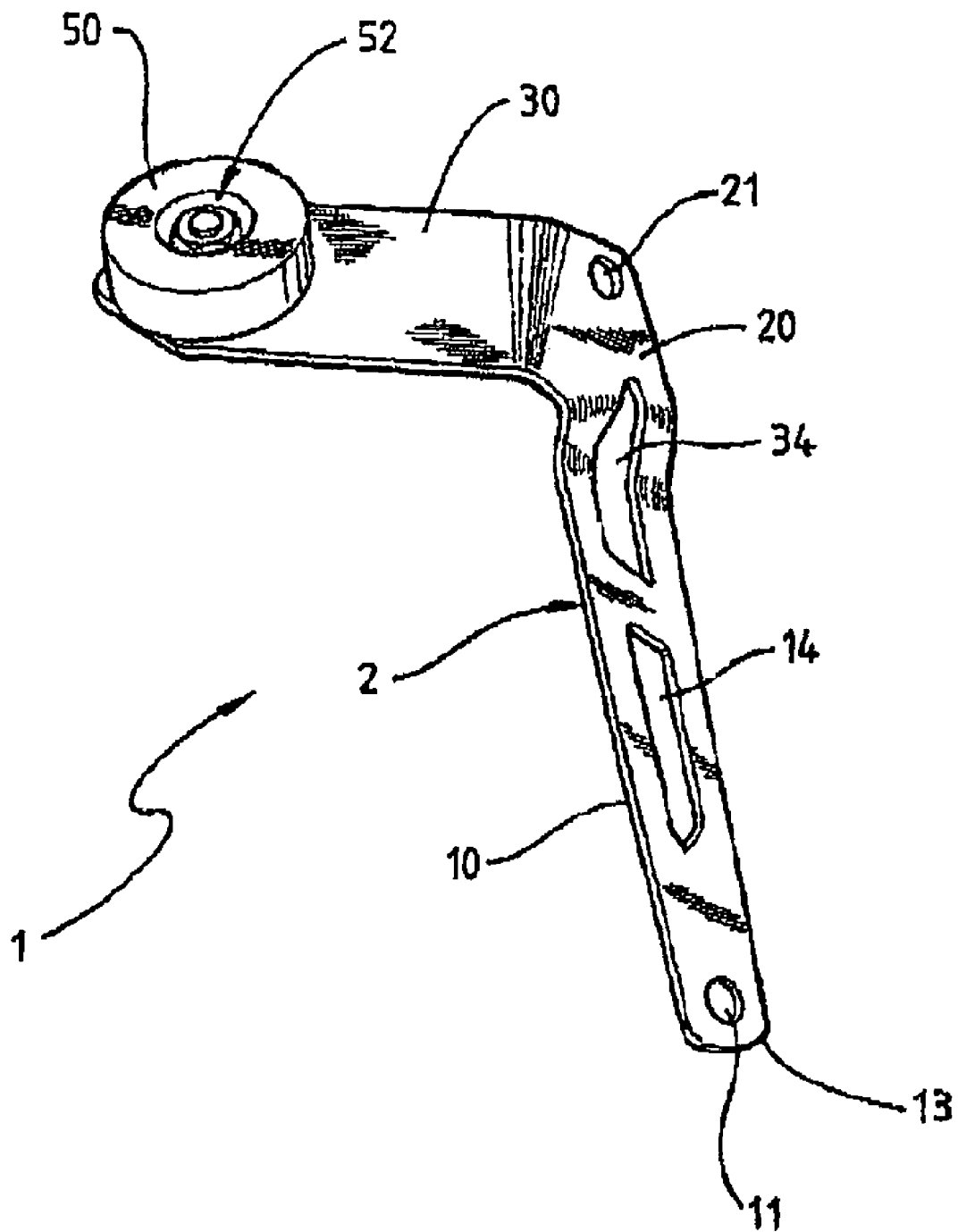
FIG. 3 shows a front view of the leg support according to a preferred embodiment of the invention.

FIGS. 1 to 3 show the leg support for a motorcycle according to a preferred embodiment of the invention.

In this preferred embodiment, the invention provides a leg support 1 for a motorcycle which provides a means of assisting a person to hold their body in a forward position while riding. The leg support 1 shall be described herein in terms of being applied to a motorcycle. However, it is envisaged that it may be modified to suit any other type of bike. The leg support 1 has been designed with simplicity and effectiveness in mind although it is to be acknowledged that the features of the leg support and its design may be further developed to provide a product which is more technically advanced and/or has provided additional functionality. It is further envisaged that the shape, style and dimensions of the leg support 1 may be varied to suit different motorcycles or bikes and/or applications so long as the requirements of the invention are met.

The leg support 1 preferably has provided a body portion 2. The body portion 2 of the leg support is preferably made of a metal material, such as high grade aluminium or the like. However, it is envisaged that any other suitable material which provides strength and durability may also be employed. The body portion 2 is preferably in the form of a brace member which is adapted to secure the leg support 1 to the frame and/or chassis of a motorcycle. The body portion 2 is preferably L-shaped to accommodate the shape of the motorcycle frame shape and is adapted to have provided two outwardly extending portions. However, it is envisaged that the shape of the body portion 2 may be varied as desired to suit other different motorcycles or design styles. The outer edge/perimeter of the body portion 2 may preferably be curved or straight to provide a configuration for the leg support 1 to suit the profile of a motorcycle.

The body portion preferably has provided a first outwardly extending portion 10. The first outwardly extending portion 10 is preferably adapted to be attached and secured to the frame 3 of a motorcycle. The first outwardly extending portion 10 is adapted to extend outwardly from a middle portion 20 of the body portion 2 of the leg support 1. Provided at the apex 13 of the first outwardly extending portion 10 is preferably an aperture 11 which is adapted to receive a securing means 12 therethrough. The securing means 12 may preferably be a bolt or screw or any other suitable securing means.

The outer side edges of the first outwardly extending portion 10 are preferably adapted to taper inwardly from the middle portion 20 of the body portion 2 toward the apex 13 of the first outwardly extending member 10. Provided along the length of the first outwardly extending member 10 is preferably at least one additional aperture 14 which is adapted to receive a securing means therethrough. In a preferred embodiment, the first outwardly extending member 10 has provided three apertures 14. The additional aperture(s) 14 is/are adapted to provide the ability to secure the leg support 1 at different points in order to provide the best configuration for the leg support 1 so that the body portion 2 of the leg support 1 can be fitted as closely as possible to the motorcycle. The aperture(s) 14 is/are preferably irregular in shape. However, it is envisaged that any other suitable shape may also be adopted. In a preferred embodiment, the diameter of the apertures 14 preferably increases as the position of the aperture 14 is closer to the middle portion 20 of the body portion 2.

The body portion 2 preferably has provided a second outwardly extending portion 30. The second outwardly extending portion 30 is adapted to be attached to the chassis body of a motorcycle. The second outwardly extending portion 30 is adapted to extend outwardly from a middle portion 20 of the body portion 2 of the leg support 1 in a right angle direction to the first outwardly extending portion 10. Provided at the end 31 of the second outwardly extending portion 30 is preferably a slot 32 which is adapted to receive a securing means 52 therethrough. The slot 32 is preferably adapted to extend along the lateral length of the second outwardly extending member 30 for a prescribed distance. The slot 32 is adapted to provide a degree of adjustment in a forward or backward direction for a peg 50 attached thereto. However, in an alternate embodiment, it is envisaged that the slot 32 could extend longitudinally to enable upward or downward adjustment of a peg 50. It is further envisaged that an alternate connection portion or securing mechanism (not shown) could also be provided for connection of a peg 50 to the body portion 2 of the leg support 1. The securing means 52 may preferably be a bolt or screw or any other suitable securing means. It is envisaged that the number of additional apertures provided on the first and second outwardly extending portions 10, 30 may be varied as desired. In an alternate embodiment, it is envisaged that no additional apertures may be provided.

The middle portion 20 of the body portion 2 is preferably adapted to provide support for the outwardly extending portions 10, 30 of the leg support 1 and is the point where the bases of the two outwardly extending portions 10, 30 meet. In a preferred embodiment, the body portion 2 is preferably made or cast as a single integrally formed piece. The middle portion 20 preferably has provided an aperture 21 which is adapted to be positioned toward the outer edge of the middle portion 20 of the body portion 2 of the leg support 1. The aperture 21 is adapted to receive a securing means 22 therethrough in order to secure the middle portion and brace member 2 to the chassis of a motorcycle. The aperture 21 may preferably be circular or any other suitable shape. However, it is envisaged that in an alternate design of the leg support 1, the aperture 21 may be omitted.

The leg support 1 preferably has provided a support member 50. The support member 50 is adapted to receive a person's leg or foot to be held thereagainst. The support member 50 is preferably in the form of a peg or knob which is adapted to be attached to the motorcycle via the brace member 2. The peg or knob 50 is preferably circular in shape. However, it is envisaged that any other suitable shape or style could also be adopted. It is further envisaged that any other suitable support member 50 could also be adopted. The peg or knob 50 preferably has provided a central aperture 51 which is adapted to receive a securing means 52 therethrough in order to secure the peg or knob 50 and brace member 2 to the frame and/or chassis of a motorcycle. The securing means 52 may preferably be a bolt or screw or any other suitable securing means.

The leg support preferably has provided at least one securing means. In a preferred embodiment, the invention preferably has provided three securing means 12, 22, 52 which are adapted to secure the two outwardly extending portions 10, 30 of the brace member 2 and peg or knob 50 to the frame and/or chassis of a motorcycle. The securing means 12, 22, 52 is preferably in the form of a bolt or the like. The bolt 12, 22, 52 preferably has provided a threaded portion 4 having at least one thread thereon with a hexagonal head 5 that can be used to rotate and tighten the bolt 12, 22, 52. The bolt 12, 22, 52 can preferably be secured in place using a nut 6 which can be tightened to securely hold the bolt head 5 against the frame and/or chassis of the motorcycle. The nut 6 preferably has provided a central threaded aperture 7 for receiving and engaging with the threaded portion 4 of a bolt 12, 22, 52 inserted therethrough. The securing means 12, 22, 52 may preferably have provided a washer 8 in the form of a flat, circular disc which is adapted to be positioned between the bottom of the bolt head 5 and the frame and/or chassis in order to act as a buffer and prevent damage to the surface of the frame and/or chassis which could result from excessive tightening of the bolt 12, 22, 52. In an alternate embodiment, it is envisaged that the securing means 12, 22, 52 can be a screw or any other suitable securing/fastening device.

In practice, the first 10 and second 30 outwardly extending portions of the brace member 2 are attached to the frame and/or chassis of the motorcycle using apertures 11, 14, 32, 34 which best allow the brace member 2 to be fitted as closely as possible to the motorcycle. The aperture 51 of the peg or knob 50 is then aligned with the slot 32 provided on the second outwardly extending portion 30 of the brace member 1 and is attached to the chassis of the motorcycle using a securing means 52. The securing means 52 is preferably slightly loosened so that the peg or knob 50 can be allowed to slide forward or backward along the slot 32 for adjustment as desired. A rider on the motorcycle can then place their leg or foot against the leg support 1 in order to keep their body in a forward position on the bike whilst riding to provide assistance, particular when standing and accelerating through rough terrain.

While we have described a particular embodiment of a leg support 1 for a motorcycle, it is further envisaged that other embodiments of the invention could exhibit any number and combination of any one of the features previously described. However, it is to be understood that any variations and modifications can be made without departing from the spirit and scope thereof.

I claim:

1. A process for mounting a leg support for a motorcycle, the process including:
   providing the leg support, the leg support comprising a support member and a body member, the body member comprising at least two outwardly extending portions extending from a middle portion at an angle to each other;
   securing a first outwardly extending portion of the at least two outwardly extending portions of the body member to a chassis of the motorcycle;
   connecting the support member to a second outwardly extending portion of the at least two outwardly extending portions of the body member such that the support member extends freely and outwardly from the body member;

whereby connecting the support member to the second outwardly extending portion of the body member further comprises positioning the support member at a position above a foot pedal of the motorcycle wherein the support member engages with and supports the calf of a rider of the motorcycle when a foot of the rider is on the foot pedal, thereby assisting the rider to hold their body in a forward position while riding.

2. A process for mounting a leg support as claimed in claim 1 wherein the middle portion of the body member is also attached to the chassis of the motorcycle.

3. A process for mounting a leg support as claimed in claim 1 wherein the second outwardly extending portion of the body member comprises a slot which is adapted to receive a securing means therethrough for adjustably mounting the support member.

4. A process for mounting a leg support as claimed in claim 3 wherein the slot is adapted to extend along the lateral length of the second outwardly extending portion of the body member for a prescribed distance to provide a degree of adjustment in a forward or backward direction for the support member attached thereto.

5. A process for mounting a leg support as claimed in claim 1 wherein the support member is in the form of a peg or knob which is adapted to be adjustably secured to the second outwardly extending portion of the body member.

6. A process for mounting a leg support as claimed in claim 5 wherein the peg or knob has provided a central aperture which is adapted to receive a securing means therethrough.

7. A process for mounting a leg support as claimed in claim 6 wherein the securing means is in the form of a bolt or screw.

8. A process for mounting a leg support as claimed in claim 1 wherein the at least two outwardly extending portions extend from the middle portion of the body member at an angle to each other to form substantially a L-shape.

9. A process for mounting a leg support as claimed in claim 1 wherein the middle portion comprises a curve element connected to the second outwardly extending portion to provide a strengthening connection to support the freely extending second outwardly extending portion and to provide an element of curvature around the chassis of the motorcycle.

10. A process for mounting a leg support for a motorcycle, the process including:

providing a motorcycle;

providing the leg support, the leg support comprising a support member and a body member, the body member comprising at least two outwardly extending portions extending from a middle portion at an angle to each other; a first outwardly extending portion of the at least two outwardly extending portions having a substantially planar configuration with at least one aperture for receiving at least one securing means for securing said first outwardly extending portion to a chassis of the motorcycle; a second outwardly extending portion of the at least two outwardly extending portions extending from the middle portion of the body member and supported by the first outwardly extending portion and with a shape to closely follow the chassis of the motorcycle; the support member being located by the second outwardly extending portion such that the leg support is configured to be mounted on the chassis above a foot pedal whereby the support member extends from the chassis of the motorcycle such that the support member engages with and supports the leg of a rider of the motorcycle when the rider stands on the foot pedal of the motorcycle, thereby assisting the rider to hold their body in a forward position while riding;

securing the first outwardly extending portion of the body member to the chassis of the motorcycle;

securing the middle portion of the body member to the chassis of the motorcycle; and aligning an apertures of the support member with a slit provided on the second outwardly extending portion of the body member using a securing means allowing for forward or backward adjustment along the slot.

\* \* \* \* \*